United States Patent
Amrhein et al.

(10) Patent No.: US 9,501,274 B1
(45) Date of Patent: Nov. 22, 2016

(54) QUALITATIVE FEEDBACK CORRELATOR

(71) Applicant: International Business Machines Corporation, Armonk, NY (US)

(72) Inventors: Dustin K. Amrhein, Zachary, LA (US); Kulvir S. Bhogal, Forth Worth, TX (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/009,880

(22) Filed: Jan. 29, 2016

(51) Int. Cl.
*G06F 9/44* (2006.01)

(52) U.S. Cl.
CPC ........................................ *G06F 8/70* (2013.01)

(58) Field of Classification Search
CPC .......................................................... G06F 8/70
USPC ............................................................ 717/120
See application file for complete search history.

(56) References Cited

U.S. PATENT DOCUMENTS

| | | | |
|---|---|---|---|
| 6,363,378 B1 * | 3/2002 | Conklin | G06F 17/30646 |
| 6,964,036 B2 * | 11/2005 | Bates | G06F 11/3664 |
| | | | 714/38.13 |
| 7,103,885 B2 * | 9/2006 | Foster | G06F 8/71 |
| | | | 717/170 |
| 7,222,333 B1 * | 5/2007 | Mor | G06F 8/41 |
| | | | 709/201 |
| 7,321,988 B2 * | 1/2008 | Guo | G06F 11/366 |
| | | | 714/38.11 |
| 7,412,699 B2 * | 8/2008 | Francis | G06F 8/30 |
| | | | 717/158 |
| 7,454,744 B2 * | 11/2008 | Bhogal | G06F 8/73 |
| | | | 717/122 |
| 7,461,368 B2 * | 12/2008 | White | G06F 11/3624 |
| | | | 714/E11.207 |
| 7,496,906 B2 * | 2/2009 | Black-Ziegelbein | G06F 11/3624 |
| | | | 717/124 |
| 7,500,221 B2 * | 3/2009 | Baumann | G06F 8/73 |
| | | | 715/206 |
| 7,519,621 B2 * | 4/2009 | Harik | G06F 17/2247 |
| 7,526,753 B2 * | 4/2009 | Spencer | G06F 8/71 |
| | | | 717/109 |
| 7,627,851 B2 * | 12/2009 | Lotter | G06F 8/70 |
| | | | 717/106 |
| 7,849,440 B1 * | 12/2010 | Englehart | G06F 8/34 |
| | | | 715/762 |
| 8,117,610 B2 * | 2/2012 | Mitchell | G06F 8/73 |
| | | | 717/173 |
| 8,341,600 B2 * | 12/2012 | Sutherland | G06F 8/71 |
| | | | 717/120 |

(Continued)

FOREIGN PATENT DOCUMENTS

| | | | |
|---|---|---|---|
| WO | 2014058243 A1 | 4/2014 | |
| WO | 2014063124 A1 | 4/2014 | |

OTHER PUBLICATIONS

Retrieving and Analyzing Mobile Apps Feature Requests from Online Reviews—Claudia Iacob, Rachel Harrison, Department of Computing and Communication Technologies, Oxford Brookes University—Oxford, United Kingdom—MSR 2013, San Francisco, CA, USA; 2013 IEEE.*

(Continued)

*Primary Examiner* — Francisco Aponte
(74) *Attorney, Agent, or Firm* — Kristofer L. Haggerty

(57) ABSTRACT

A computer receives one or more partitions of application code and one or more tags associated with each partition. The computer identifies feedback corresponding to the application and determines whether terms contained within the feedback correspond to the tags associated with the partitions of code. Based on determining that the terms within the feedback correspond to the tags associated with a partition, associating the feedback with the corresponding partition of code. Based on determining that the terms within the feedback do not correspond to the tags associated with a partition, improving correlating accuracy through techniques such as machine learning, text analytics, natural language processing, and developer feedback to determine additional terms and additional tags.

17 Claims, 4 Drawing Sheets

(56) References Cited

U.S. PATENT DOCUMENTS

| | | | | |
|---|---|---|---|---|
| 8,418,130 | B2* | 4/2013 | Tittizer | G06F 8/73 717/106 |
| 8,438,468 | B2* | 5/2013 | Berg | G06F 8/73 715/230 |
| 8,527,307 | B2* | 9/2013 | Hamilton, II | G06Q 30/02 705/7.11 |
| 8,763,131 | B2 | 6/2014 | Archer et al. | |
| 8,819,629 | B2* | 8/2014 | Sherrill | G06F 8/73 717/123 |
| 8,832,841 | B2 | 9/2014 | Archer et al. | |
| 8,893,144 | B2* | 11/2014 | Haham | G06F 8/445 718/100 |
| 9,106,607 | B1* | 8/2015 | Lepeska | H04L 67/2847 |
| 9,251,013 | B1* | 2/2016 | Walsh | G06F 11/1471 |
| 9,274,756 | B1* | 3/2016 | Clausen | G06F 8/30 |
| 2002/0029231 | A1* | 3/2002 | Aptus | G06F 8/20 715/210 |
| 2003/0171907 | A1* | 9/2003 | Gal-On | G06F 17/5022 703/14 |
| 2007/0006152 | A1* | 1/2007 | Ahmed | G06F 8/71 717/122 |
| 2007/0100898 | A1* | 5/2007 | Petras | G06F 17/30699 |
| 2007/0180455 | A1* | 8/2007 | Mariani | G06F 8/73 719/328 |
| 2007/0250810 | A1* | 10/2007 | Tittizer | G06F 8/73 717/110 |
| 2007/0299825 | A1* | 12/2007 | Rush | G06F 17/30997 |
| 2009/0089275 | A1* | 4/2009 | Drory | G06F 17/30693 |
| 2011/0191406 | A1* | 8/2011 | Plunkett | G06F 15/16 709/203 |
| 2011/0246968 | A1* | 10/2011 | Zhang | G06F 8/751 717/125 |
| 2012/0272207 | A1* | 10/2012 | Lerner | G06F 8/71 717/102 |
| 2012/0278194 | A1 | 11/2012 | Dewan et al. | |
| 2012/0310711 | A1* | 12/2012 | Lang | G06Q 10/0639 705/7.42 |
| 2014/0101195 | A1 | 4/2014 | Li et al. | |
| 2014/0201702 | A1* | 7/2014 | Kaplinger | G06F 8/76 717/101 |
| 2015/0082282 | A1 | 3/2015 | Larsen et al. | |
| 2015/0242494 | A1* | 8/2015 | Safaie | G06F 17/30867 707/749 |
| 2015/0269639 | A1* | 9/2015 | Mistriel | G06Q 50/01 705/319 |
| 2016/0026732 | A1* | 1/2016 | He | G06F 17/30867 707/752 |

OTHER PUBLICATIONS

Corpus-based analysis of domain-specific languages—Robert Tairas and Jordi Cabot—Jun. 9, 2013; © Springer-Verlag Berlin Heidelberg 2013.*

Recommendation Systems for Software Engineering—Martin P. Robillard, McGill University; Robert J. Walker, University of Calgary; Thomas Zimmermann, Microsoft Research—IEEE Software Published by the IEEE Computer Society; 2010 IEEE.*

Akhawe et al., "Product Labels for Mobile Application Markets," Position Paper, 4 pgs., http://www.mostconf.org/2012/papers/22.pdf, Mobile Security Technologies, San Francisco, 2012 (Best Date Available).

Iacob et al., "Retrieving and Analyzing Mobile Apps Feature Requests from Online Reviews," Proceedings of the 10th Working Conference on Mining Software Repositories, ISBN: 978-1-4673-2936-1, pp. 41-44, © IEEE, http://dl.acm.org/citation.cfm?id=2487094, IEEE Press, Piscataway, NJ, USA, Copyright 2013 (Best Date Available).

* cited by examiner

(12) United States Patent
US 9,501,274 B1

QUALITATIVE FEEDBACK CORRELATOR

BACKGROUND

The present invention relates generally to user feedback of a computer program, and more particularly to correlating user application feedback to specific lines of corresponding computer application code.

There are many mediums through which developers receive feedback about the quality of their applications. In addition to standard bug reporting tools, users also submit qualitative feedback via means such as forums and application stores. The problem, however, is that it is difficult to correlate feedback with the specific areas of code to which it relates. This is particularly true with qualitative feedback where, unlike quantitative feedback which can be traced back to a particular bug or glitch, the feedback may be written broadly or vaguely. As such, the current approach relies on an individual programmer/developer's ability to digest qualitative feedback and understand the areas of code to which that feedback pertains.

SUMMARY

Embodiments of the present invention disclose a method, system, and computer program product for correlating end user feedback with corresponding computer program code. A computer receives one or more partitions of application code and one or more tags associated with each partition. The computer identifies feedback corresponding to the application and determines whether any terms contained within the feedback correspond to the tags associated with the partitions of code. Based on determining that the terms within the feedback correspond to the tags associated with a partition, associating the feedback with the corresponding partition of code. Based on determining that the terms within the feedback do not correspond to the tags associated with a partition, improving correlating accuracy through techniques such as machine learning, text analytics, natural language processing, and developer feedback to determine additional terms and additional tags.

DETAILED DESCRIPTION

Embodiments of the present invention will now be described in detail with reference to the accompanying figures.

Figure 1:
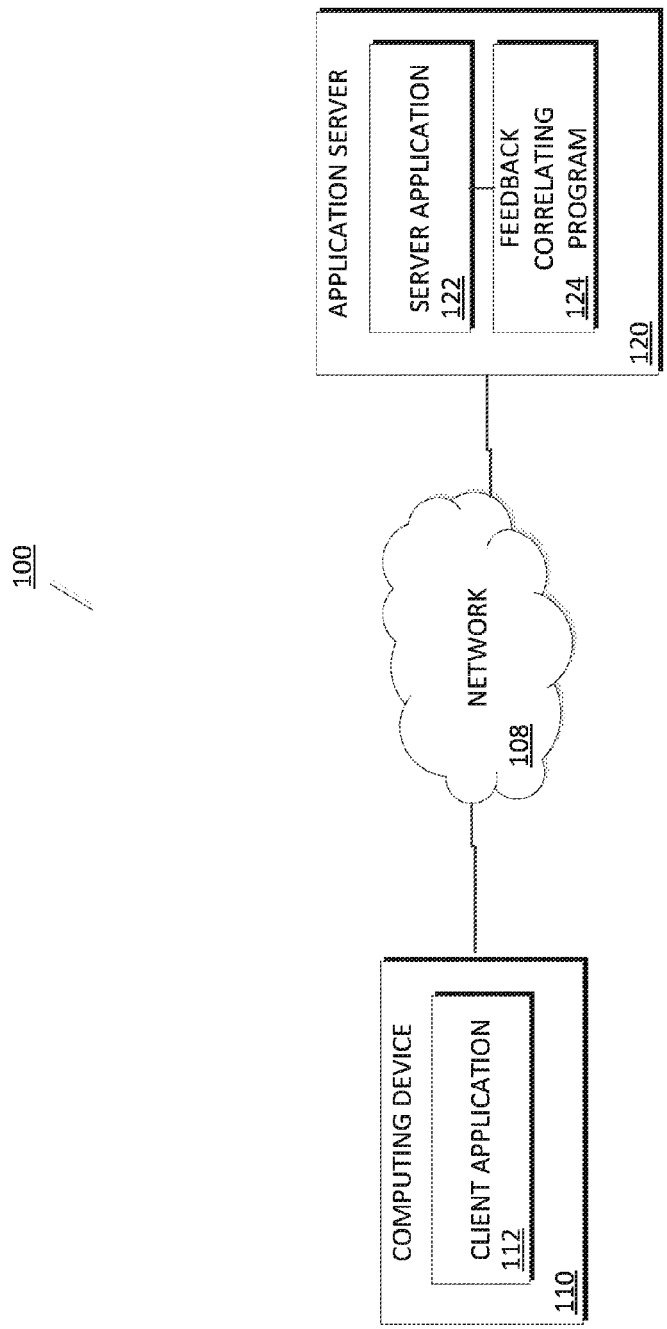
FIG. 1 illustrates a feedback correlating system, in accordance with an embodiment of the invention.

FIG. 1 illustrates a feedback correlating system 100, in accordance with an embodiment of the invention. In the example embodiment, feedback correlating system 100 includes network 108, computing device 110, and application server 120.

In the example embodiment, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between computing device 110 and application server 120.

In the example embodiment, computing device 110 includes client application 112. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 4.

In the example embodiment, client application 112 is a program on computing device 110 which acts as the user interface of a remote application, such as server application 122, on a server, such as application server 120. In the example embodiment, client application 112 provides a graphic user interface (GUI) to a user, such as the user of computing device 110, from which the user is capable of entering user input. Client application 112 is further capable of transmitting the received user input as well as receiving data over a network, such as network 108, to and from a server.

In the example embodiment, application server 120 includes server application 122 and feedback correlating program 124. In the example embodiment, application server 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While application server 120 is shown as a single device, in other embodiments, application server 120 may be comprised of a cluster or plurality of computing devices, working together or working separately. Application server 120 is described in more detail with reference to FIG. 4.

In the example embodiment, server application 122 is a collection of computer application code designed to perform a group of coordinated functions, tasks, or activities for the benefit of the user, such as an online banking application, a GPS navigation service, or an email application. In the example embodiment, server application 122 is accessed via a client, such as client application 112, however in other embodiments, server application 122 may be accessed via other means.

In the example embodiment, feedback correlating program 124 is a computer program on application server 120 which is integrated with server application 122. In the example embodiment, feedback correlating program 124 is capable of extracting and replicating computer application code, such as the computer application code of server application 122. Feedback correlating program 124 is further capable of receiving partitioned sections of the received computer application code and storing tags in association with each section of code. Feedback correlating program 124 is additionally capable of receiving user feedback corresponding to a computer application, such as server application 122, and identifying terms contained in the feedback. Feedback correlating program 124 is further capable of determining whether the terms in the user feedback match the tags associated with the partitions of code and, if so, storing the qualitative feedback in association with the corresponding partitions of code. Feedback correlating program 124 is additionally capable of improving the accuracy at which the feedback is associated with code partitions through means such as developer feedback, natural language processing, and text analytics.

Figure 2:
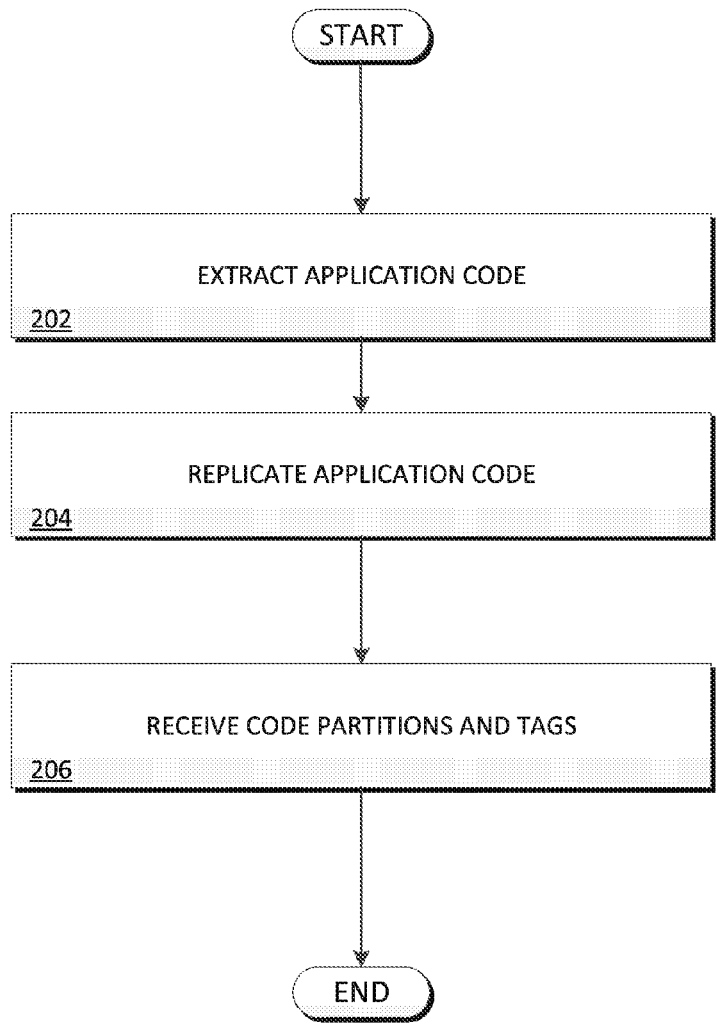
FIG. 2 is a flowchart illustrating the operation of a feedback correlating program of FIG. 1 in configuration a feedback correlating program to associate feedback with relevant sections of program code.

FIG. 2 is a flowchart depicting the operation of feedback correlating program 124 in receiving a configuration utilized to partition and tag application code. In embodiments where the application code to be partitioned and tagged already exists, feedback correlating program 124 first extracts the code of the existing application and replicates it within the user interface of feedback correlating program 124 such that the partitions and tags can be designated by a user. In embodiments where the application code is either partitioned and tagged in a native programming/debugging interface of server application 122 or partitioned and tagged as the code is initially programmed, steps 202 and 204 may be skipped.

Feedback correlating program 122 extracts the application code of an existing application (step 202). In the example embodiment where feedback correlating program 124 is integrated with server application 122, feedback correlating program 122 extracts the application code of server application 122 via integration with server application 122. For example, if server application 122 is an online banking application, feedback correlating program 124 extracts the application code of the banking application via integration with the online banking application. In other embodiments, however, feedback correlating program 124 may extract the application code of server application 122 alternatively, such as receiving a user input detailing the location of the application code from a programmer (the user of application server 120). In further embodiments, however, such as when the application code is partitioned and tagged in a native programming/debugging interface of server application 122 or partitioned and tagged as the code is initially programmed, extraction of the application code may not be necessary.

Feedback correlating program replicates the program code of an application (step 204). In the example embodiment, feedback correlating program 124 replicates the application code of server application 122 in the user interface of feedback correlating program 124 via integration with server application 122. Continuing the example above, feedback correlating program 124 replicates the application code of the online banking application within the user interface of feedback correlating program 124 via integration with the online banking application. In other embodiments, however, such as when the application code is partitioned and tagged in a native programming/debugging interface of server application 122 or partitioned and tagged as the code is initially programmed, replication of the application code in feedback correlating program 124 may not be necessary.

Feedback correlating program 124 receives code partitions (sections) and corresponding tags associated with an operational phase/component of an application (step 206). In the example embodiment, the programmer (the user of application server 120) partitions the application code of server application 122 within the user interface of feedback correlating program 124 via user input, such as by highlighting the desired partition of code and selecting an option to designate the chosen code as a distinct partition. Continuing the example above, if the online banking application has five primary operational phases relevant to user feedback, then feedback correlating program 124 receives partitions of code from the programmer corresponding to the five operational phases of application initialization, prompting user login, authenticating user login, money management, and logout. Feedback correlating program 124 additionally receives tags related to and/or describing the operational phases partitioned above. In the example embodiment, the related tags are input by the programmer and are descriptive of/related to the operational phases of server application 122. The related tags are then associated with the corresponding operational phase and later compared to user feedback in order to better identify the operational phase relevant to the feedback (described in greater detail below). In the example embodiment, the received tags are saved in association with the corresponding operational phase within a reference database which is accessed by feedback correlating program 124 via local or remote mapping of the reference database location. Continuing the example above, if the operational phase money management involves depositing, transferring, and withdrawing funds, then the tags "deposit funds," "transfer funds," and "withdraw funds" may be associated with the operational phase money management within the reference database. When one or more of such tags are identified in an instance of feedback, feedback correlating program 124 associates the feedback with the corresponding operational phase and section of code.

Figure 3:
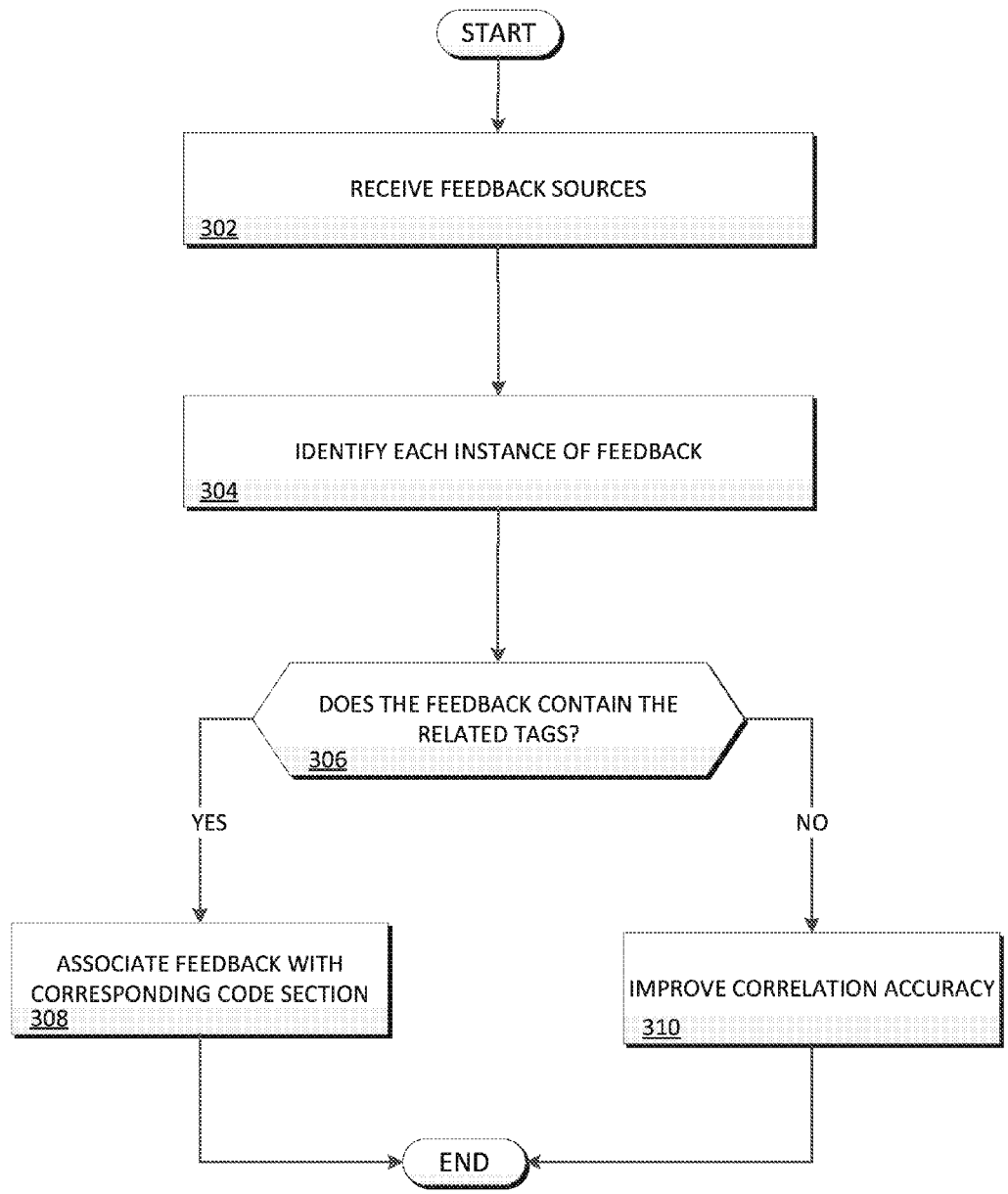
FIG. 3 is a flowchart illustrating the operations of feedback correlating program of FIG. 1 in correlating feedback with relevant sections of program code.

FIG. 3 is a flowchart depicting the operations of feedback correlating program 124 in retrieving end user feedback and correlating the feedback with a particular operational phase.

Feedback correlating program 124 receives one or more source locations of end user feedback regarding the subject application (step 302). In the example embodiment, feedback correlating program 124 is configured to retrieve feedback from end users via mapping to locations where the relevant feedback is stored. Such feedback includes both direct communication with an end user, such as communications by email and instant messaging, as well as indirect communication with an end user, such as feedback provided by users in application stores, public/private forums, and message boards. In the example embodiment, the programmer of server application 122 maps or links feedback source locations, such as specific webpages, application stores, email inboxes, etc., corresponding to the subject application and sets periodic intervals at which feedback correlating program 124 checks said source(s) for feedback, such as a daily, hourly, or minutely basis. Continuing the banking application example above, if the sources for end user feedback are the application installation page of an application store, a specific page of a public forum, and an email inbox corresponding to application customer support, then feedback correlating program 124 is provided the location of the application installation page of the application store, the specific page of the public forum, and the inbox corresponding to the customer support of the application.

In addition, feedback correlating program 124 may be configured to learn the common locations of user feedback (step 302 continued). In the example embodiment, feedback correlating program 124 learns the common sources and locations of user feedback by monitoring the behavior of the programmer, such as web browser navigation, application activity/navigation, email activity, clicking activity, scroll positions, and visible computer screen coordinates. Feedback correlating program 124 records such behavior, including the duration of time spent at a particular location or in a particular scroll position, and determines whether the behavior is persistent enough to be considered a feedback source. For example, feedback correlating program 124 may compare the time spent at a web location to a threshold time period of fifteen minutes to determine whether the location is a feedback source. Similarly, feedback correlating program 124 may compare the frequency at which the user navigated to the website per day/week to a threshold frequency of five instances to determine whether the website is a feedback source. Furthermore, feedback correlator 124 may be configured to require both time and frequency thresholds be satisfied to consider a commonly frequented location a feedback source. Continuing the example above, if feedback correlating program 124 monitors the programmer for several weeks and determines that the programmer frequently navigates to a public application forum for greater than fifteen minutes more than ten times a day, six days a week, then feedback correlating program 124 identifies the public application forum a feedback source. In the example embodiment, the identified feedback source is added to a list of sources, from which the programmer can modify, add, or remove sources as desired.

Having been provided the location(s) of end user feedback, feedback correlating program 124 identifies each instance of feedback contained in the source(s) (step 304). In the example embodiment, feedback correlating program 124 utilizes natural language processing, character recognition techniques, and markup language analysis to identify individual instances of feedback left by a user. In the example embodiment, feedback correlating program 124 is configured to identify instances of feedback by identifying usernames, timestamps, application ratings, and other characters indicative of user feedback. For example, feedback correlating program 124 may identify end user feedback by comparing words in potential feedback with a list of users who have downloaded the application. If the username corresponding to a user who has previously downloaded the application appears in an instance of potential feedback, it is likely that the potential feedback was feedback left by said user. For example, if potential feedback for the online banking example above contains the term KamSmith and KamSmith is listed as the username of a user who has recently downloaded the online banking application, then feedback correlating program 124 identifies the potential feedback as feedback. Similarly, feedback correlating program 124 may be configured to associate other characters, such as fractions and images of stars (4.4/5 stars), with ratings in order to identify feedback.

When applicable, feedback correlating program 124 is additionally configured to analyze the hypertext markup language (HTML) of the feedback source in order to identify sections of webpages associated with feedback (step 304 continued). Using the example above, if user feedback is commonly located in the "body" section of the application installation webpage on the application store, then feedback correlating program 124 may be configured to search the "body" of the application installation page for indications of feedback. Furthermore, feedback correlating program 124 may be configured to identify other indications of feedback within the HTML of a feedback source. For example, if each instance of feedback is contained in a "container" of specific size within the "body" of the application installation webpage, then feedback correlating program 124 may be configured to consider the "containers" of said specific size instances of feedback. Similarly, if an inbox is consistently located in the "body" of the host webpage and the subject of all customer support emails include the word "review," then feedback correlating program 124 may be configured to search the "body" of the webpage for the word "review" in order to identify feedback.

In the example embodiment, feedback correlation program 124 is configured to require identification of a specific number of feedback indicating criteria before potential feedback is considered feedback (step 304 continued). Referring to the online banking application example above, if feedback correlation program 124 is configured to require that the potential feedback found on the application store contain three feedback indicating criteria and potential feedback includes the username of a user who previously downloaded the application, a fraction indicative of a rating, and a timestamp, then feedback correlating program 124 identifies the potential feedback as feedback. In other embodiments, however, the determination of feedback may be made by alternative means.

Feedback correlating program 124 determines whether the feedback contains terms which match or are synonymous with the tags associated with each operational phase in step 204 (decision 306). In the example embodiment, feedback correlating program 124 determines whether the feedback contains terms that match or are synonymous with the tags associated with the operational phases by utilizing optical character recognition, natural language processing, and word/synonym matching techniques. In addition, feedback correlating program 124 references synonym databases and other information sources to identify matching terms and tags. In other embodiments, however, feedback correlating program 124 may determine whether any of the tags identified in the feedback matches a tag associated with the code sections by other means.

If feedback correlating program 124 determines that the feedback contains a term which matches or is synonymous with a tag associated with an operational phase (decision 306 "YES" branch), then feedback correlating program 124 associates the feedback with the corresponding operational phase (step 308). In the example embodiment, feedback correlating program 124 associates the feedback with the corresponding operational phase by tagging the feedback with the operational phase within the metadata of the feedback. In other embodiments, however, feedback correlating program 124 may associate the feedback with the corresponding operational phase otherwise, such as storing the text of the feedback, a link to the feedback, or a screenshot of the feedback in a database associated with each operational phase. In the example embodiment, feedback correlating program 124 provides an interface from which the programmer may select partitions of code to display corresponding feedback and vice versa. Feedback correlating program 124 may be further configured to determine whether the feedback is positive or negative by searching the feedback for positive/negative terms within several characters or words of operational phases in a similar manner as the manner in which terms are identified above. In addition, feedback correlating program 124 may additionally be configured to notify the programmer each time feedback is associated with an operational phase as well as keep detailed statistics of feedback associated with each operational phase, such as the operational phase most frequently correlated with feedback or most positive/negative feedback. Continuing the example above where "deposit funds" is a tag associated with the money management operational phase, if an instance of feedback contains the terms "depositing funds is easy," then feedback correlating program 124 matches the instance of feedback with the operational phase money management. Furthermore, feedback correlating program 124 may be configured to identify the feedback as positive feedback because the term "easy" is within several words of the tag "deposit funds" in the absence of negatives such as "not." In the example embodiment, feedback correlating program 124 may be configured to associate feedback with any number of operational phases depending on the tag(s) identified in the feedback and the configuration of the reference database.

If feedback correlating program 124 determines that the feedback does not contain a term which matches or is synonymous with a tag associated with an operational phase (decision 306 "NO" branch), then feedback correlating program 124 improves the accuracy at which feedback correlating program 124 matches feedback to operational phases of server application 122 (step 310). In the example embodiment, feedback correlating program 124 improves correlation accuracy through text analytics, natural language processing techniques, machine learning techniques, and programmer feedback. When the terms contained in feedback fail to match/synonymize the tags associated with an operational phase, feedback correlating program 124 aims to both identify the relevance of the feedback as well as increase the number of tags associated with the operational phases. In order to achieve this, feedback correlating program 124 first utilizes text analytics, natural language processing, and machine learning techniques to identify synonyms and recognize patterns found in feedback text syntax. By identifying the synonyms of terms within the feedback as well as the syntax patterns of text, feedback correlating program 124 identifies the meaning of text rather than the words comprising it (for example, "cool" can mean low in temperature, calm, or stylish). Continuing the example above, if feedback states "application won't start", then feedback correlating program 124 identifies synonyms and usage patterns of the word "start" to determine that, in this context, "start" is likely synonymous with the term initialize, and thus the feedback is associated with the application initialization phase of operation. Furthermore, now the tag "start" is stored in association with the operational phase of application initialization in the reference database for future feedback comparisons. If feedback correlating program 124 cannot match the feedback with an operational phase after applying text analytics, natural language processing, and machine learning techniques to the feedback, then feedback correlating program 124 provides the feedback to the programmer of the application in order to not only identify the relevance of the feedback, but to also associate new tags found within the feedback with the appropriate operational phase when applicable. In the example embodiment, feedback correlating program 124 provides the programmer with both the unmatched feedback as well as the user interface utilized in to identify the partitions and tags in step 206. If the programmer, upon reviewing user feedback, identifies a tag that is descriptive of/related to an operational phase which is not stored in the reference database, the programmer utilizes the interface of feedback correlator 124 to associate the tag with the appropriate operational phase. Continuing the example above, if the programmer of server application 122 is reviewing user feedback and identifies the words "transfer fee" in an instance of feedback regarding money management, then the programmer enters the tag "transfer fee" into the user interface provided by feedback correlating program 124 and associates the tag with the money management phase of operation.

Figure 4:
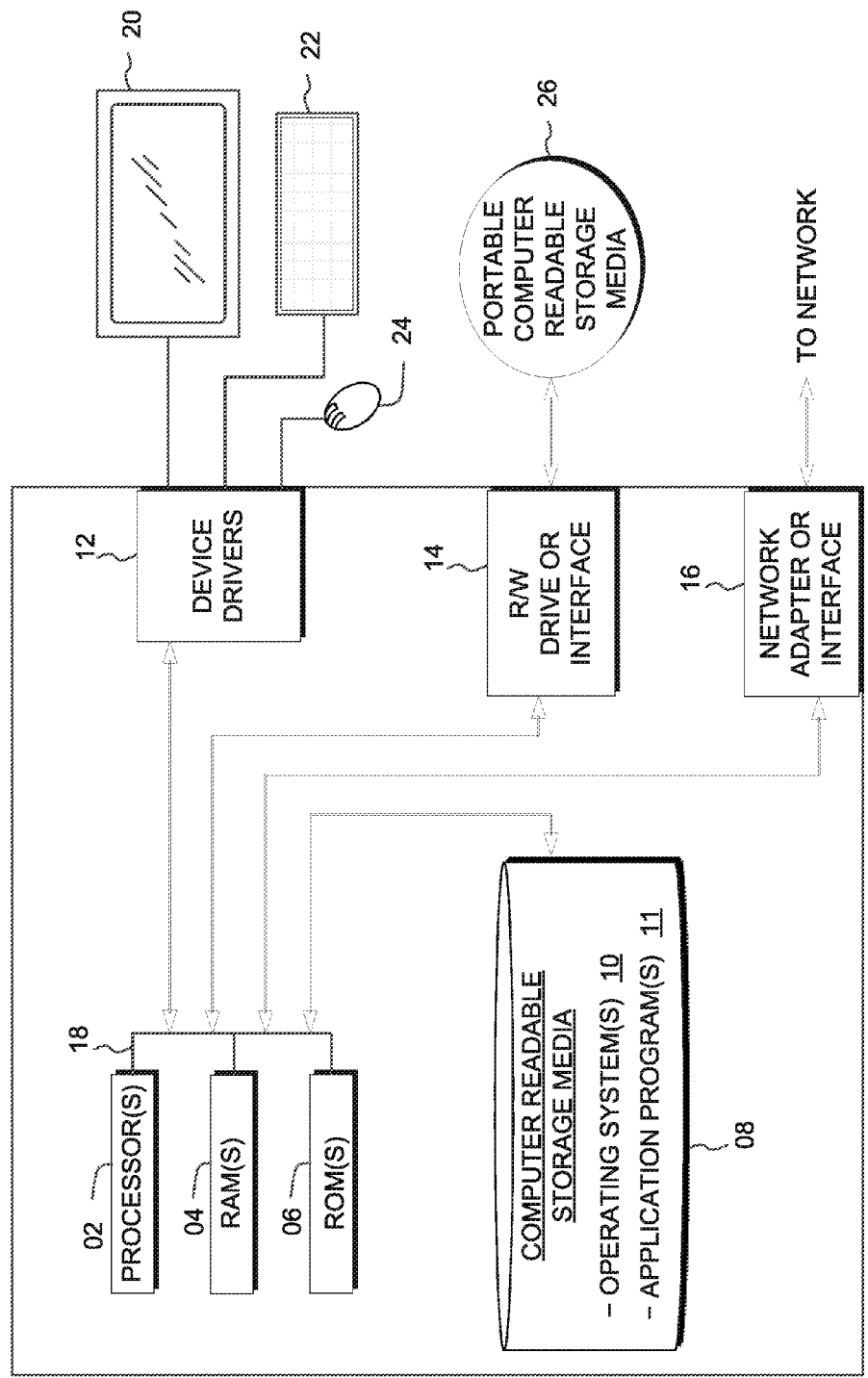
FIG. 4 is a block diagram depicting the hardware components of the feedback correlating system of FIG. 1, in accordance with an embodiment of the invention.

FIG. 4 depicts a block diagram of components of computing device 110 of a feedback correlating system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example, feedback correlating program 124, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on computing device 110 may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on computing device 110 may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for correlating user feedback with program code, the method comprising:
   a computer receiving a first set of one or more tags associated with a first section of code of one or more sections of code, wherein the one or more sections of code correspond to an application;
   the computer identifying feedback corresponding to the application, wherein the feedback contains a first set of one or more terms, and wherein identifying feedback corresponding to the application further comprises the computer utilizing a method selected from the group consisting of natural language processing, character recognition techniques, and markup language analysis to:
      identify one or more feedback indicators within the feedback, wherein the one or more feedback indicators include an indicator selected from the group consisting of a username, a timestamp, and a rating associated with the application;
      determine whether an amount of the one or more feedback indicators is greater than a threshold amount of the one or more feedback indicators; and
      based on determining that the amount of the one or more feedback indicators is greater than the threshold amount of the one or more feedback indicators, determine whether the feedback is positive;
   the computer computing feedback statistics, wherein the feedback statistics include a code section associated with a largest amount of feedback, a code section associated with a largest amount of positive feedback, and a code section associated with a largest amount of negative feedback;
   the computer determining whether at least one term of the first set of one or more terms corresponds to at least one tag in the first set of one or more tags; and
   based on determining that at least one term of the first set of one or more terms corresponds to at least one tag in the first set of one or more tags, the computer associating the feedback with the first section of code.

2. The method of claim 1, further comprising:
   based on determining that no terms of the first set of one or more terms correspond to at least one tag in the first set of one or more tags, the computer determining a second set of one or more terms by applying a method selected from the group consisting of text analytics, natural language processing, and machine learning techniques to the first set of one or more terms;
   the computer updating the first set of one or more terms by adding the second set of one or more terms to the first set of one or more terms;
   the computer determining whether at least one term of the updated first set of one or more terms corresponds to at least one tag in the first set of one or more tags; and
   based on determining that at least one term of the updated first set of one or more terms corresponds to at least one tag in the first set of one or more tags, the computer associating the feedback with the first section of code.

3. The method of claim 2, further comprising:
   based on determining that no terms of the updated first set of one or more terms correspond to at least one tag in the first set of one or more tags, the computer providing the feedback to a user associated with the application without associating the feedback with the one or more sections of code;
   the computer receiving a third set of one or more terms from the user based on the provided feedback; and
   the computer modifying the updated first set of one or more terms by adding the third set of one or more terms to the updated first set of one or more terms.

4. The method of claim 1, further comprising:
   the computer receiving a second set of one or more tags associated with a second section of code of the one or more sections of code;
   the computer determining whether at least one term of the first set of one or more terms corresponds to at least one tag in the second set of one or more tags; and
   based on determining that at least one term of the first set of one or more terms corresponds to at least one tag of the second set of one or more tags, the computer associating the feedback with the second section of code.

5. The method of claim 1, wherein determining whether at least one term of the first set of one or more terms corresponds to at least one tag in the first set of one or more tags further comprises:
   the computer comparing the at least one term of the first set of one or more terms to at least one tag in the first set of one or more tags;
   the computer identifying one or more synonyms of the at least one term of the first set of one or more terms by referencing a database; and
   the computer comparing the one or more synonyms to at least one tag of the first set of one or more tags.

6. The method of claim 1, wherein identifying feedback corresponding to the application further comprises:
   the computer identifying one or more locations navigated to by a user;
   the computer determining whether a duration of time spent by the user on at least one of the one or more locations is greater than a threshold duration of time;
   based on determining that the duration of time spent on the at least one of the one or more locations is greater than the threshold duration of time, the computer determining whether a frequency at which the user navigates to the at least one of the one or more is greater than a threshold frequency; and
   based on determining that the frequency at which the user navigates to the at least one of the one or more locations is greater than the threshold frequency, the computer storing the at least one of the one or more locations as a source for feedback corresponding to the application.

7. A computer program product for correlating user feedback with program code, the computer program product comprising:
   one or more non-transitory computer-readable storage media and program instructions stored on the one or more computer-readable storage media, the program instructions comprising:
   program instructions to receive a first set of one or more tags associated with a first section of code of one or more sections of code, wherein the one or more sections of code correspond to an application;
   program instructions to identify feedback corresponding to the application, wherein the feedback contains a first set of one or more terms, and wherein the program instructions to identify feedback corresponding to the application further comprise program instructions to utilize a method selected from the group consisting of natural language processing, character recognition techniques, and markup language analysis to:
  identify one or more feedback indicators within the feedback, wherein the one or more feedback indicators include an indicator selected from the group consisting of a username, a timestamp, and a rating associated with the application;
  determine whether an amount of the one or more feedback indicators is greater than a threshold amount of the one or more feedback indicators; and
  based on determining that the amount of the one or more feedback indicators is greater than the threshold amount of the one or more feedback indicators, determine whether the feedback is positive;
program instructions to compute feedback statistics, wherein the feedback statistics include a code section associated with a largest amount of feedback, a code section associated with a largest amount of positive feedback, and a code section associated with a largest amount of negative feedback;
program instructions to determine whether at least one term of the first set of one or more terms corresponds to at least one tag in the first set of one or more tags; and
based on determining that at least one term of the first set of one or more terms corresponds to at least one tag in the first set of one or more tags, program instructions to associate the feedback with the first section of code.

8. The computer program product of claim 7, further comprising:
  based on determining that no terms of the first set of one or more terms correspond to at least one tag in the first set of one or more tags, program instructions to determine a second set of one or more terms by applying a method selected from the group consisting of text analytics, natural language processing, and machine learning techniques to the first set of one or more terms;
  program instructions to update the first set of one or more terms by adding the second set of one or more terms to the first set of one or more terms;
  program instructions to determine whether at least one term of the updated first set of one or more terms corresponds to at least one tag in the first set of one or more tags; and
  based on determining that at least one term of the updated first set of one or more terms corresponds to at least one tag in the first set of one or more tags, program instructions to associate the feedback with the first section of code.

9. The computer program product of claim 8, further comprising:
  based on determining that no terms of the updated first set of one or more terms correspond to at least one tag in the first set of one or more tags, program instructions to provide the feedback to a user associated with the application without associating the feedback with the one or more sections of code;
  program instructions to receive a third set of one or more terms from the user based on the provided feedback; and
  program instructions to modify the updated first set of one or more terms by adding the third set of one or more terms to the updated first set of one or more terms.

10. The computer program product of claim 7, further comprising:
  program instructions to receive a second set of one or more tags associated with a second section of code of the one or more sections of code;
  program instructions to determine whether at least one term of the first set of one or more terms corresponds to at least one tag in the second set of one or more tags; and
  based on determining that at least one term of the first set of one or more terms corresponds to at least one tag of the second set of one or more tags, program instructions to associate the feedback with the second section of code.

11. The computer program product of claim 7, wherein the program instructions to determine whether at least one term of the first set of one or more terms corresponds to at least one tag in the first set of one or more tags further comprise:
  program instructions to compare the at least one term of the first set of one or more terms to at least one tag in the first set of one or more tags;
  program instructions to identify one or more synonyms of the at least one term of the first set of one or more terms by referencing a database; and
  program instructions to compare the one or more synonyms to at least one tag of the first set of one or more tags.

12. The computer program product of claim 7, wherein the program instructions to identify feedback corresponding to the application further comprise:
  program instructions to identify one or more locations navigated to by a user;
  program instructions to determine whether a duration of time spent by the user on at least one of the one or more locations is greater than a threshold duration of time;
  based on determining that the duration of time spent on the at least one of the one or more locations is greater than the threshold duration of time, program instructions to determine whether a frequency at which the user navigates to the at least one of the one or more is greater than a threshold frequency; and
  based on determining that the frequency at which the user navigates to the at least one of the one or more locations is greater than the threshold frequency, program instructions to store the at least one of the one or more locations as a source for feedback corresponding to the application.

13. A computer system for correlating user feedback with program code, the computer system comprising:
  one or more computer processors, one or more computer-readable storage media, and program instructions stored on one or more of the computer-readable storage media for execution by at least one of the one or more processors, the program instructions comprising:
  program instructions to receive a first set of one or more tags associated with a first section of code of one or more sections of code, wherein the one or more sections of code correspond to an application;
  program instructions to identify feedback corresponding to the application, wherein the feedback contains a first set of one or more terms, and wherein the program instructions to identify feedback corresponding to the application further comprise program instructions to utilize a method selected from the group consisting of natural language processing, character recognition techniques, and markup language analysis to:
    identify one or more feedback indicators within the feedback, wherein the one or more feedback indicators include an indicator selected from the group consisting of a username, a timestamp, and a rating associated with the application;

determine whether an amount of the one or more feedback indicators is greater than a threshold amount of the one or more feedback indicators; and based on determining that the amount of the one or more feedback indicators is greater than the threshold amount of the one or more feedback indicators, determine whether the feedback is positive;

program instructions to compute feedback statistics, wherein the feedback statistics include a code section associated with a largest amount of feedback, a code section associated with a largest amount of positive feedback, and a code section associated with a largest amount of negative feedback;

program instructions to determine whether at least one term of the first set of one or more terms corresponds to at least one tag in the first set of one or more tags; and based on determining that at least one term of the first set of one or more terms corresponds to at least one tag in the first set of one or more tags, program instructions to associate the feedback with the first section of code.

14. The computer system of claim 13, further comprising:

based on determining that no terms of the first set of one or more terms correspond to at least one tag in the first set of one or more tags, program instructions to determine a second set of one or more terms by applying a method selected from the group consisting of text analytics, natural language processing, and machine learning techniques to the first set of one or more terms;

program instructions to update the first set of one or more terms by adding the second set of one or more terms to the first set of one or more terms;

program instructions to determine whether at least one term of the updated first set of one or more terms corresponds to at least one tag in the first set of one or more tags; and based on determining that at least one term of the updated first set of one or more terms corresponds to at least one tag in the first set of one or more tags, program instructions to associate the feedback with the first section of code.

15. The computer system of claim 14, further comprising:

based on determining that no terms of the updated first set of one or more terms correspond to at least one tag in the first set of one or more tags, program instructions to provide the feedback to a user associated with the application without associating the feedback with the one or more sections of code;

program instructions to receive a third set of one or more terms from the user based on the provided feedback; and program instructions to modify the updated first set of one or more terms by adding the third set of one or more terms to the updated first set of one or more terms.

16. The computer system of claim 13, wherein the program instructions to determine whether at least one term of the first set of one or more terms corresponds to at least one tag in the first set of one or more tags further comprises:

program instructions to compare the at least one term of the first set of one or more terms to at least one tag in the first set of one or more tags;

program instructions to identify one or more synonyms of the at least one term of the first set of one or more terms by referencing a database; and program instructions to compare the one or more synonyms to at least one tag of the first set of one or more tags.

17. The computer system of claim 13, wherein the program instructions to identify feedback corresponding to the application further comprise:

program instructions to identify one or more locations navigated to by a user;

program instructions to determine whether a duration of time spent by the user on at least one of the one or more locations is greater than a threshold duration of time;

based on determining that the duration of time spent on the at least one of the one or more locations is greater than the threshold duration of time, program instructions to determine whether a frequency at which the user navigates to the at least one of the one or more is greater than a threshold frequency; and based on determining that the frequency at which the user navigates to the at least one of the one or more locations is greater than the threshold frequency, program instructions to store the at least one of the one or more locations as a source for feedback corresponding to the application.

* * * * *